United States Patent
Higashio (12) 
(10) Patent No.: US 6,421,062 B1
(45) Date of Patent: *Jul. 16, 2002

(54) APPARATUS AND METHOD OF INFORMATION PROCESSING AND STORAGE MEDIUM THAT RECORDS INFORMATION PROCESSING PROGRAMS

(75) Inventor: Kimihiko Higashio, Kobe (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,470

(22) Filed: May 8, 1998

(30) Foreign Application Priority Data

May 13, 1997 (JP) .................................................. 9-122319

(51) Int. Cl.$^7$ .................................................. G09G 5/42
(52) U.S. Cl. ..................................................... 345/634
(58) Field of Search .............................. 345/431, 634, 345/636, 641; 358/448, 450, 452, 453, 589; 348/231

(56) References Cited

U.S. PATENT DOCUMENTS

| | | | | |
|---|---|---|---|---|
| 5,477,264 A | * | 12/1995 | Sarbadhikari et al. | 348/231 |
| 5,982,394 A | * | 11/1999 | Takahiro | 345/508 |
| 6,111,586 A | * | 8/2000 | Ikeda et al. | 345/433 |

* cited by examiner

Primary Examiner—Jeffery Brier
(74) Attorney, Agent, or Firm—Morrison & Foerster, LLP (57) ABSTRACT

To provide an information processing apparatus that selects decorations suitable for image data to display the decorations together with the images. In an information processing apparatus that manages image data together with its content information, a decoration that is suitable for an image assigned by the user, from predetermined decorations, is selected based on event information contained in the content information of the image data. The resulting image displays the selected decoration together with the image assigned by the user.

20 Claims, 12 Drawing Sheets

31 Image database

| Index | Data name | Data pass | File name | Event | Other information |
|---|---|---|---|---|---|
| 00001 | Data A | c:¥folder | img1.fpx | 01 | ... |
| 00002 | Data B | c:¥folder | img2.jpg | 02 | ... |
| 00003 | Data C | d: | img3.bmp | 03 | ... |
| 00004 | ... | ... | ... | ... | ... |
| ... | ... | ... | ... | ... | ... |

Fig.5

33 Event list

| Index | Event name | Data pass | File name |
|---|---|---|---|
| 01 | Birthday | c:¥flame | flm1.bmp |
| 02 | Christmas | c:¥flame | flm2.bmp |
| 03 | Wedding anniversary | c:¥flame | flm3.bmp |
| ... | ... | ... | ... |

Birthday

Fig. 13

Christmas

Fig. 14

Wedding anniversary

APPARATUS AND METHOD OF INFORMATION PROCESSING AND STORAGE MEDIUM THAT RECORDS INFORMATION PROCESSING PROGRAMS

This application is based on application No. 9-122319 filed in Japan, the contents of which is hereby incorporated by reference.

FIELD OF THE INVENTION

The present invention relates to information processing apparatus that stores and manages image data.

BACKGROUND OF THE INVENTION

The field of information processing has recently developed remarkably. In particular, the performance of personal computers and the like has made rapid progress. As a result, there has been widely used, not only for special use in business but also for general use, image database apparatus, electric filing apparatus, and the like that read image data through input devices to store, manage, retrieve, and print.

In such information processing apparatus, the user can output image data input through a digital camera, a scanner, or the like into an output device such as display, printer, or the like to view the images. In this case, it will be preferable for the user, if the images are displayed with decorations. For example, when a family picture taken on Christmas is displayed, the user can much more enjoy it, if the image is output with a decoration featuring reindeer, Christmas tree, and the like. However, in a current information processing apparatus, the user can display the image alone, or display it only within a simple ornamental frame. Therefore, if the user wants to display the image with a decoration image, then the user has to choose such a decoration image to add to the image. This has been tedious work for the user.

Further, when a conventional computer manages the data of documents, images, voices, and the like, the computer manages the data with attribute information such as the size of the data, the date of creation, the name, and the like. Recently, there has been a movement toward managing data with information indicating more detailed contents than these attributes.

For example, concerning image data, a new technology called FlashPix that is aimed at popularizing the edition of image data was recently announced. This technology is a file format of image data jointly developed by Eastman Kodak, Microsoft, Hewlett Packard, and others. According to the specification of this FlashPix format, an image data file has information, called content information hereafter, that describes various contents, together with image data, to facilitate effective management of the image data. For example, the FlashPix format has a class of information called attribute group, to which belongs the file source that describes how the image data has been created, the intellectual property that includes information about ownership and copyright, and the content description hat describes the contents of the image data. The management of image data complying with FlashPix format is expected to be widely used from now on. However, there is currently no information processing apparatus that effectively uses advantages of the FlashPix format in displaying images.

SUMMARY OF THE INVENTION

The object of the present invention is therefore to solve the above problems and provide information processing apparatus that, in storing and managing image data, selects decorations suitable for the image data to display the decorations and the images together.

A first information processing apparatus in accordance with the present invention is equipped with an image storage means that stores images and their association with content information, a decoration image storage means that stores decoration images for decoration, an assigning means that assigns an image, a selection means that selects a decoration image depending on the content information, from the decoration images stored in the decoration image storage means, based on the content information associated with the assigned image, and an image output means that outputs the selected decoration image depending on the content information together with the assigned image. The first information processing apparatus automatically selects a decoration image, based on the content information of an image, to output into a display device such as a display and the like, together with the image.

A second information processing apparatus in accordance with the present invention is equipped with an image storage means that stores images and their association with content information, a decoration image storage means that stores decoration images for decoration, an assigning means that assigns an image, a selection means that selects a decoration image depending on the content information, from the decoration images stored in the decoration image storage means, an image composition means that composes a composite image from the assigned image and the selected decoration image depending on the content information, and an image output means that outputs the composite image. The second information processing apparatus automatically selects a decoration image based on the content information of an image and, after incorporating into the image, outputs the composite image into a display device such as a display and a printing device such as a printer.

An information processing method in accordance with the present invention assigns an image, reads content information associated with the assigned image, selects a decoration image for decoration from decoration images stored in a storage means, based on the content information, comprises a composite image from the assigned image and the selected decoration image, and outputs the composite image.

A recording medium in accordance with the present invention records, in a recording medium capable of being read by a computer, a program that assigns an image, reads content information associated with the assigned image, selects a decoration image for decoration stored in the storage means based on the content information, composes a composite image from the assigned image and the selected decoration image, and outputs the composite image. The computer automatically selects an ornamental frame suitable for the image by reading and executing the program stored in the recording medium and, after composing a composite image from the selected ornamental frame and the image, outputs the composite image into a display device or into a printing device.

BRIEF DESCRIPTION OF THE DRAWINGS

These and other objects and features of the present invention will become clear from the following description taken in conjunction with the preferred embodiment thereof and the accompanying drawings throughout which like parts are designated by like reference numerals, and in which.

DETAILED DESCRIPTION OF THE PREFERRED EMBODIMENTS

The preferred embodiment according to the present invention will be described below in conjunction with the attached drawings.

In information processing apparatus that stores and manages image data together with additional information that is a search key, an information processing apparatus of the present embodiment selects an ornamental frame suitable for the image data from predetermined candidates of the ornamental frame, based on content information associated with the image data, to output a composite image in displaying or printing the image. Here, the content information of the image data is information that describes the contents, such as the subject, objective, place, names of material beings, event, and the like. As the content information, the content description, which is one of the attribute group specified in the FlashPix format and describes the contents of the image data, can be used. In particular, information about event in the image, which describes the event in the image such as a birthday or an anniversary as part of the content information is used for the content information in the present embodiment.

Figure 1:
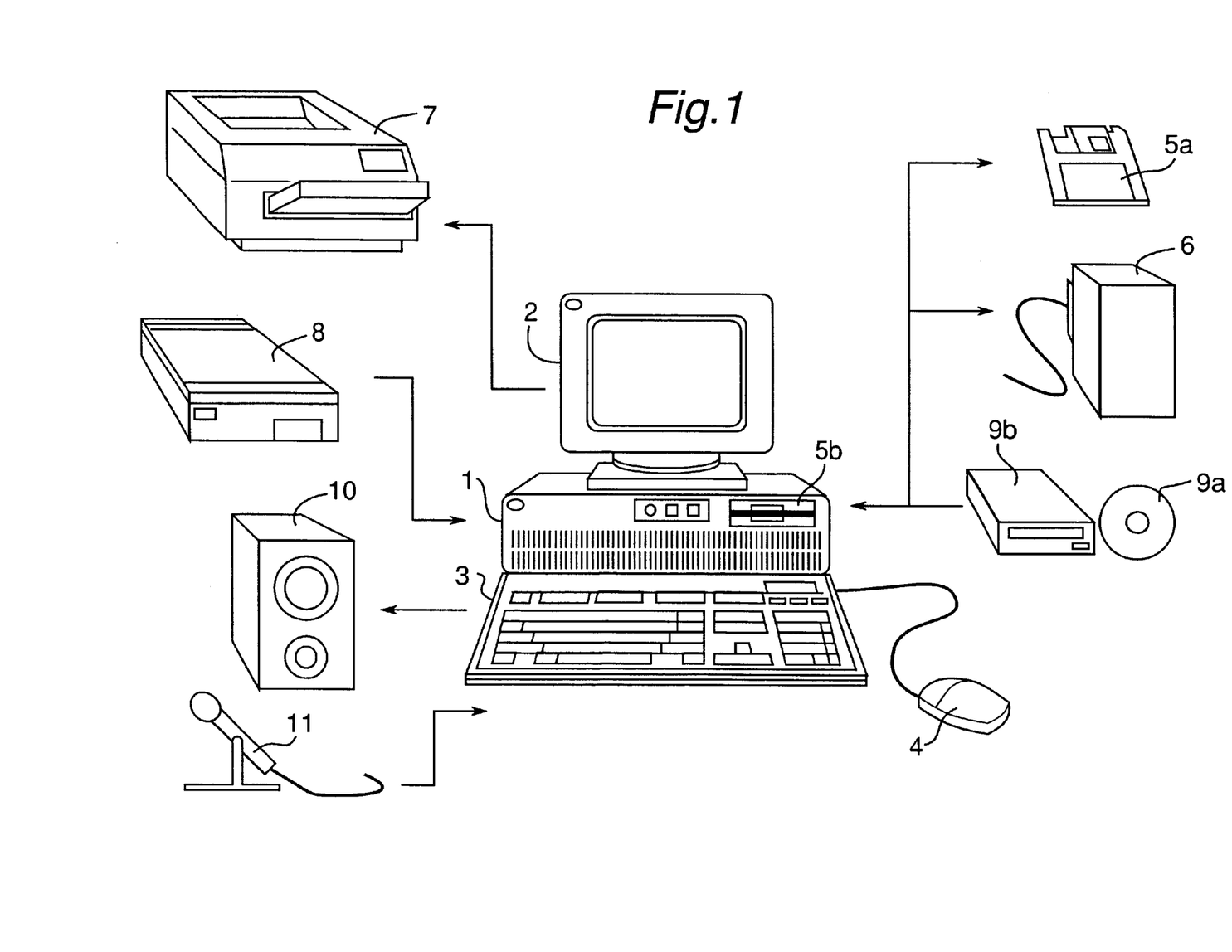
FIG. 1 is a diagram illustrating the overall configuration of information processing apparatus in the present embodiment.

The configuration and the operation of this information processing apparatus are described in the following. FIG. 1 shows the overall configuration of the information processing apparatus, called system hereafter, of the present embodiment. Referring to FIG. 1, the system has a central processing unit, called CPU, and is constructed with a control unit 1 that controls the whole system. As the CPU, a pentium processor of Intel Co. and the like can be used. To the control unit 1 is connected a display 2 that displays images, characters, and messages for operation, a keyboard 3 and a mouse 4 for performing various inputs and instructions, a floppy disk drive 5a and a hard disk drive 6 that are data storage media, a printer 7 for printing characters and images, a scanner 8 that captures images, a CD-ROM drive 9b that reads data stored in CD-ROM 9a, a speaker 10 for outputting voice, and a microphone 11 for inputting voice.

Figure 2:
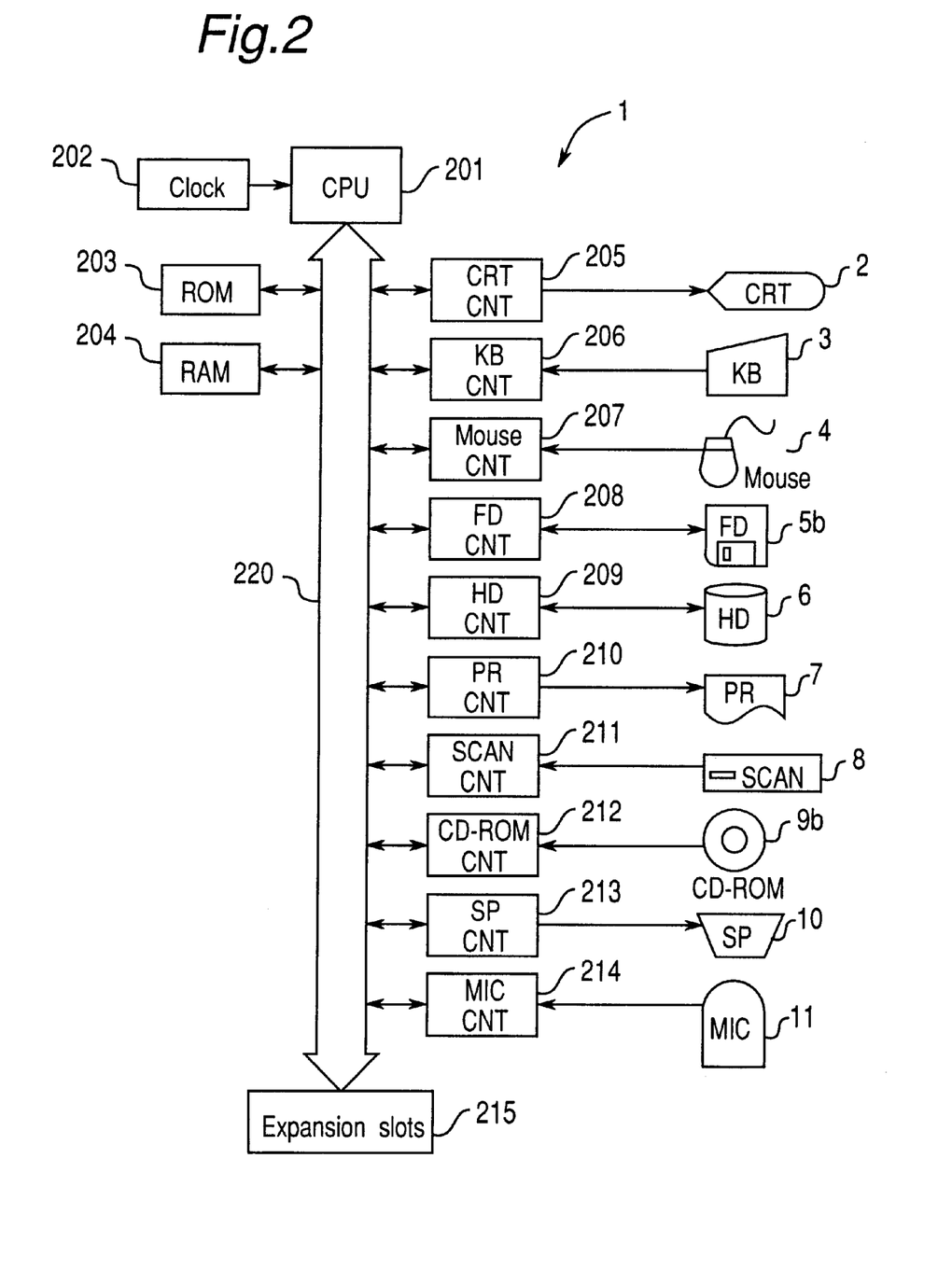
FIG. 2 is a block diagram centering around the control system.

FIG. 2 shows a block diagram of the present system. To the CPU 201 is connected a ROM 203 and a RAM 204 through a data bus 220. ROM 203 stores a program that controls the present system, and RAM 204 temporarily stores a program and data that are processed by CPU 201 for control. Among the circuits that are connected to CPU 201 through data bus 220 are a display control circuit 205, a keyboard control circuit 206, a mouse control circuit 207, a floppy disk drive control circuit 208, a hard disk drive control circuit 209, a printer control circuit 210, a scanner control circuit 211, a CD-ROM drive control circuit 212, a speaker control circuit 213, and a microphone control circuit 214. Display control circuit 205 controls display 2 to display images and characters. Keyboard control circuit 206 transfers and controls input from keyboard 3. Mouse control circuit 207 transfers and controls input from mouse 4. Floppy disk drive control circuit 208 controls floppy disk drive 5b. Hard disk control circuit 209 controls hard disk drive 6. Printer control circuit 210 controls output to printer 7. Scanner control circuit 211 controls scanner 8. CD-ROM control circuit 212 controls CD-ROM drive 9b. Speaker control circuit 213 controls speaker 10. Microphone control circuit 214 controls microphone 11. Further, a clock 202 for generating a reference clock necessary to the operation of the system is connected to CPU 201. Also, expansion slots 215 for connecting various expansion boards are connected to CPU 201 through data bus 220. Further, an SCSII board can be connected to one of expansion slots 215. In this case, floppy disk drive 5b, hard disk drive 6, scanner 8, CD-ROM drive 9b, and others can be connected to CPU 201 through the SCSII board.

The present embodiment uses floppy disk drive 5a and hard disk drive 6 for image data storage media, but other information storage media such as a magnetic optic disk (MO) and the like may be used in their place. The present embodiment uses scanner 8 for capturing images, but other image capture devices such as a still video camera, a digital camera, and the like can be used. Also, the present embodiment uses printer 7 for an output device, but other output devices such as a digital copier may be used.

In the present system, a program that implements a management system for image data is stored in ROM 203. However, part of or all of the program may be stored in an information storage medium such as floppy disk 5a or hard disk drive 6, or CD-ROM 9b. In this case, the program and data are read out from the information storage medium into RAM 204 to be processed at need. Also, the present system manages image data that has been input from external input devices and stored in hard disk drive 6. However, the system may directly mange image data stored in CD-ROM 9b. In this case, index data, which identifies image data stored in CD-ROM 9b, and search keys, which are added to the index data, are stored in hard disk drive 6. A pair of index data and its index keys for an image is called a record. When an image is retrieved, first a record is retrieved as the search result, based on set search keys. Then predetermined image data of the image is read out from CD-ROM 9b, based on the index data of the retrieved record.

Figure 3:
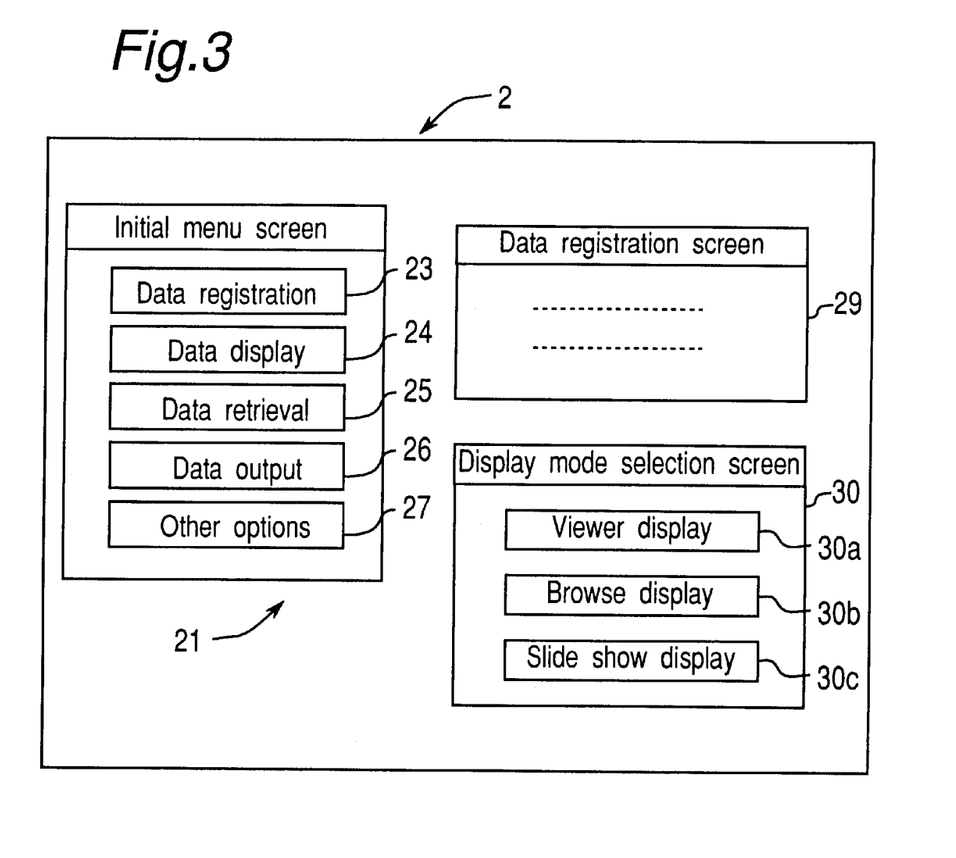
FIG. 3 shows an example of screens displayed on the display.

FIG. 3 shows an example of screens displayed on display 2, following the execution of the program in the present system. In this figure, the screen 21 is the initial menu screen displayed at the beginning of the system. Then a setting screen depending on processing is displayed by choosing one of the option items 23 to 27 of the initial menu screen 21. For example, in the initial menu screen 21, if data registration 23 is chosen in the initial menu screen 21, then a data registration screen 29 is displayed. The user inputs the value of each variable and chooses a function, on such a setting screen, with mouse 4 or keyboard 3.

Figure 4:
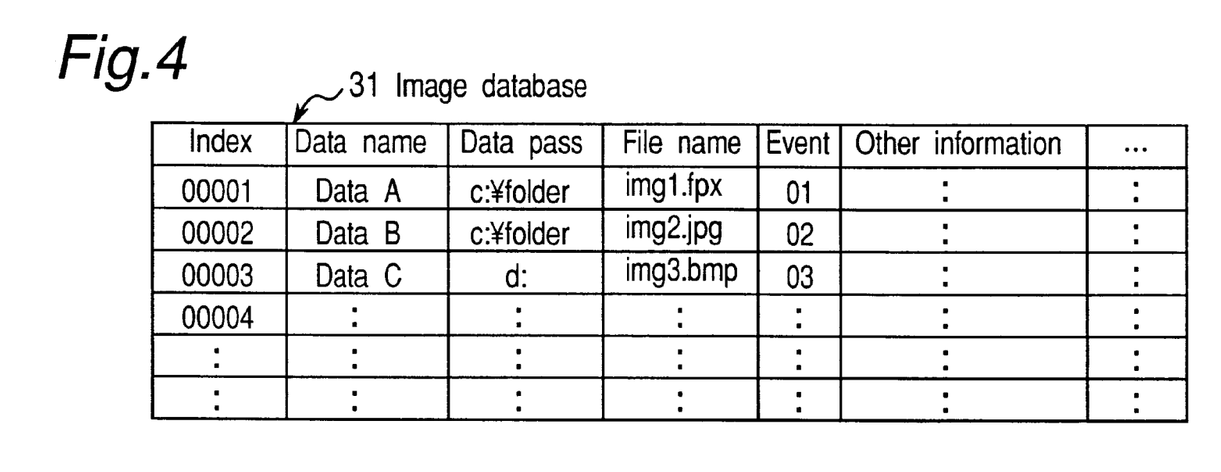
FIG. 4 shows an exemplary structure of the image database stored in the hard disk.

Further, the present system has an image database 31 that includes image data and its additional information. FIG. 4 shows an exemplary structure of image database 31. Referring to FIG. 4, database 31 has indices that are registration numbers, data names that represent contents of image data, data passes that indicate the locations of the information storage medium, such as hard disk drive 6, in which image data is stored, and file names of image data. Data base 31 also has events that describe the events of image data and has other information such as keywords as additional information.

Figure 5:
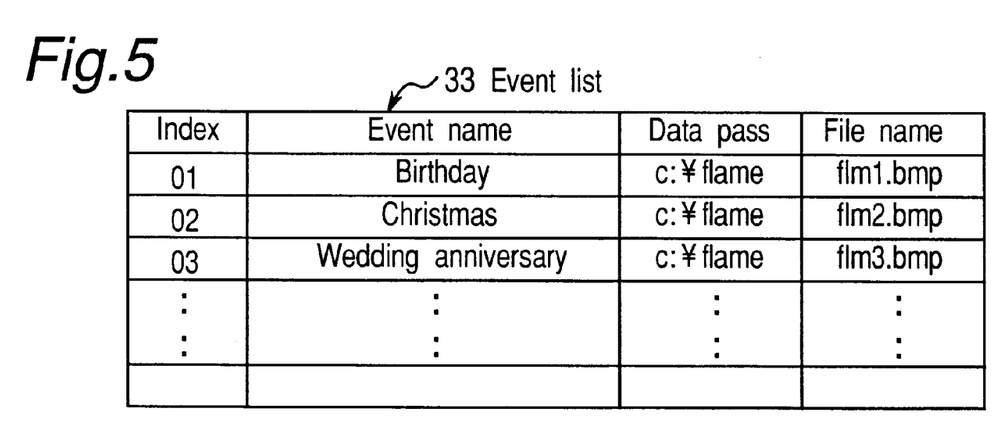
FIG. 5 shows an exemplary structure of the event list.

Further, the present system has an event list 33 that registers predetermined event information. The event list 33 relates image data with ornamental frame data through events. FIG. 5 shows an exemplary structure of event list 33. Referring to FIG. 5, event list 33 consists of indices, event names, data passes, and file names. The indices are registration numbers. The data passes indicate the locations of the information storage media, such as hard disk drive 6, at which ornamental frame data is stored corresponding to events. The file names are the names of the files in which the ornamental frame data is stored. The image database 31 and event list 33 are stored in an information storage medium such as hard disk drive 6. In the present embodiment, it is assumed that "Christmas,""birthday," "wedding anniversary" are registered in event list 33.

Figure 6:
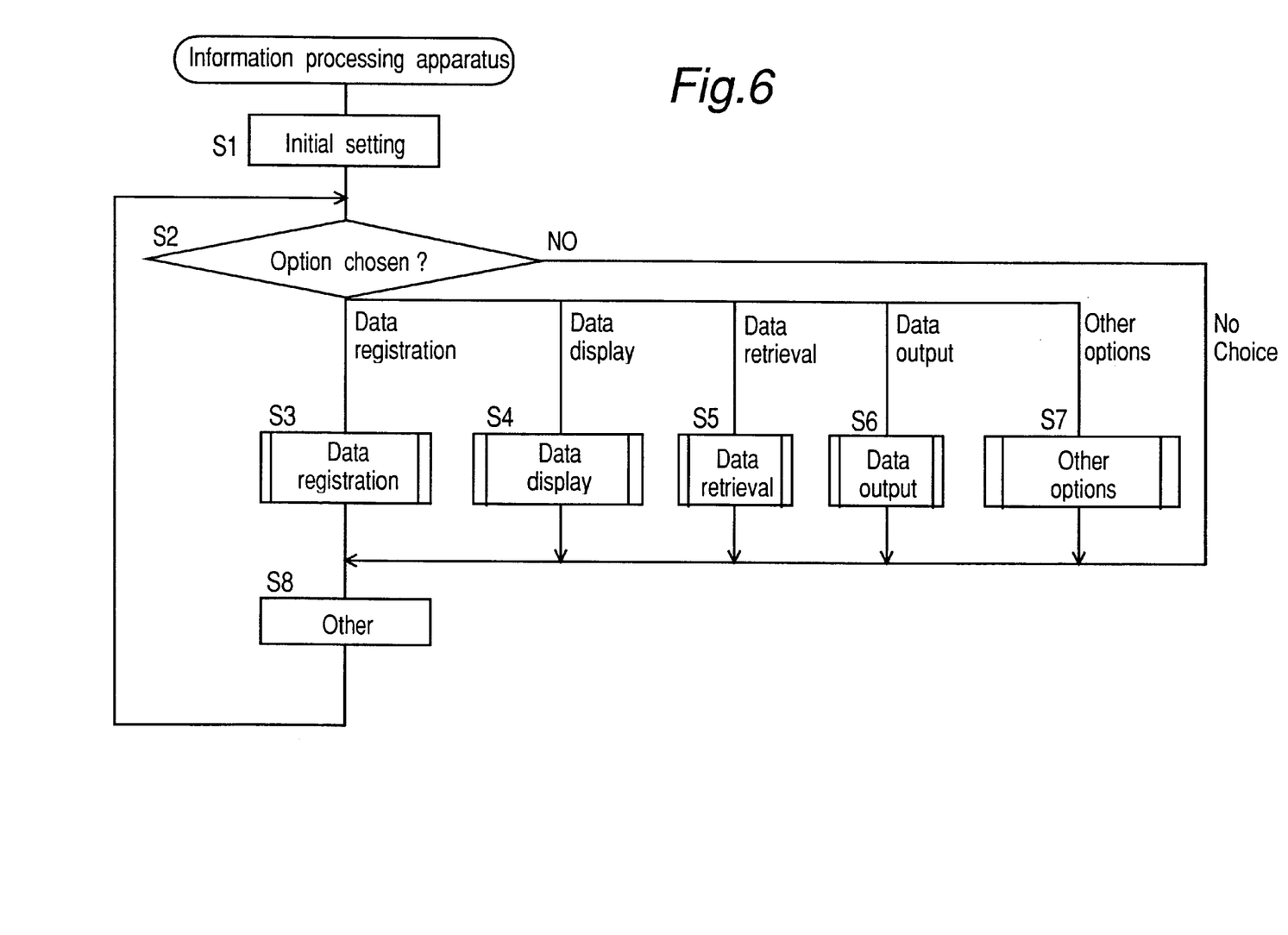
FIG. 6 is a flowchart illustrating the main routine of control processing by the CPU.

The information processing of the present system is described in the following. FIG. 6 is a flowchart that shows the main routine of the program that implements the functions of the present system. CPU 201 controls the present system based on this flowchart.

When the present program is started, initial setting such as initializing variables necessary for the processing and displaying the initial menu screen 21 on display 2 is first made (S1). Next, it is judged whether a processing option has been chosen on the initial menu screen 21 or not (S2). If data registration 23 is chosen in step S2, then data registration processing is executed (S3). The data registration processing imports image data through input devices such as scanner 8 and registers the image data in image database 31 together with predetermined information. If data display 24 is chosen in step S2, then data display processing is executed (S4). The data display processing displays images in various display formats. If data retrieval 25 is chosen in S2, then retrieval processing is executed (S5). The retrieval processing retrieves desired image data from image database 31. If data output 26 is chosen in S2, then data output processing is executed (S6). The data output processing outputs an image with image output devices such as printer 7. If other options 27 is chosen, then other options processing is executed (S7). The other options processing performs some other predetermined processing. After the processing in the above S3 to S7, or if no processing is chosen in S2, the flow proceeds with S8. In S8, processing other than the above processing of S3 to S7 is executed. When the processing of S8 is completed, then the routine returns to S2, and the same process is repeated.

The retrieval processing in S5, data output processing in S6, other options processing in S7, and other processing in step S8 are basically the same as in prior systems and are not direct concerns of the present invention, so that they are omitted from here.

Figure 7:
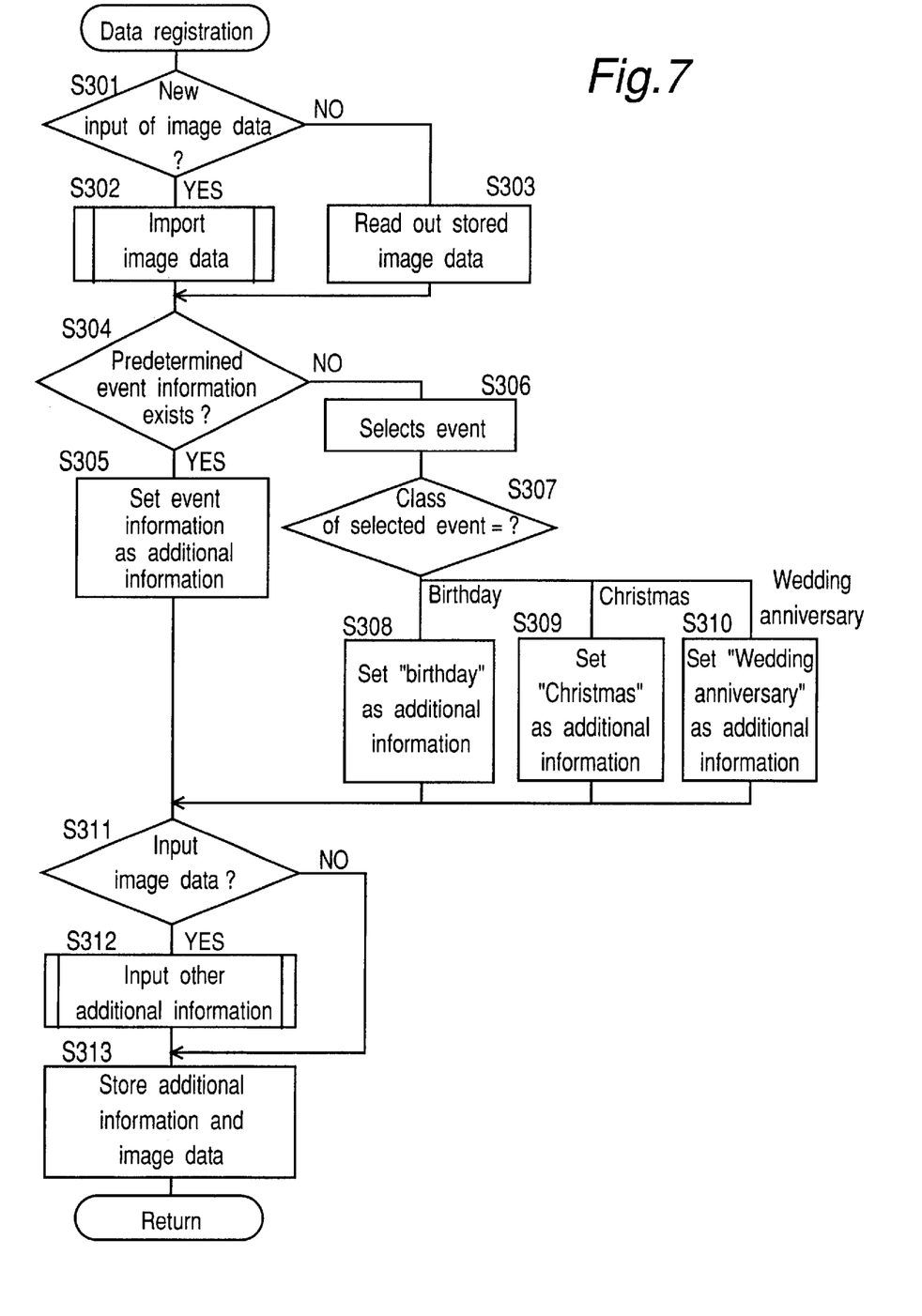
FIG. 7 is a flowchart of the processing of data registration.

Now, referring to the flowchart of FIG. 7, the data registration processing in S3 is described in the following.

When the data registration processing is chosen, the data registration screen 29 is displayed. In this processing, CPU 201 first judges whether the input of the image data is new or not, based on a value input by the user on the data registration screen 29 (S301). If the input of the image data is new, then CPU 201 executes the processing of importing image data (S302) and goes to S304. The processing of importing image data in S302 is detailed later. If the input of the image data is not new according to the judgment in S301, then CPU 201 reads out stored image data selected by the user on the data registration screen 29 (S303) and goes to S304.

In S304, CPU 201 judges whether the image data has any predetermined event information registered in event list 33. If the image data has some predetermined event information, then CPU 201 sets the event information as additional information (S305) and goes to S311. If the image data has no predetermined event information, then CPU 201 selects an event, following the user's instruction (S306). Here the user's instruction is given by selecting a suitable event on the data registration screen 29 from event candidates stored beforehand in event list 33. After S306, CPU 201 determines the class of the selected event (S307). If the class of the selected event is "birthday," then CPU 201 sets "birthday" at additional information as event information (S308). If the class of the selected event is Christmas, then CPU 201 sets "Christmas" at additional information as event information (S309). If the class of the selected event is "wedding anniversary," then CPU 201 sets "wedding anniversary" at additional information as event information (S310). Then CPU 201 goes to S311.

In S311, CPU 201 determines whether to input other additional information. If inputting other additional information, then CPU 201 executes other additional information input processing (S312) and goes to S313. The processing of inputting other additional information in S312 is detailed later. If not inputting other additional information, then CPU 201 goes to S313. In S313, CPU 201 stores the imported image data in image database 31 together with the additional information and returns from the subroutine.

Figure 8:
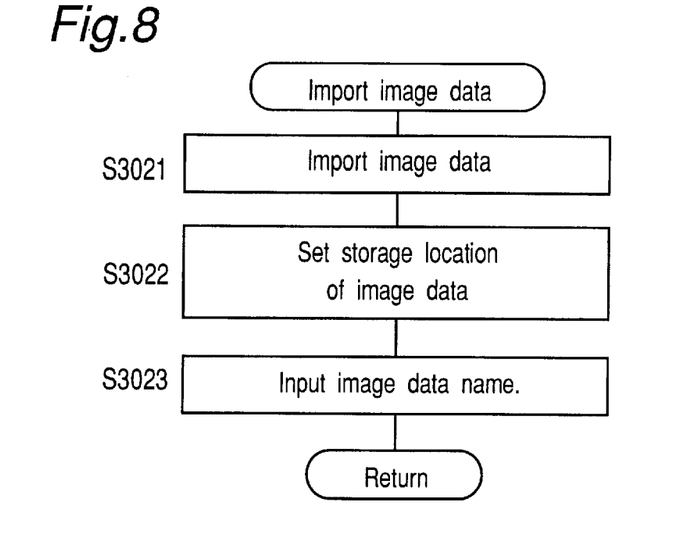
FIG. 8 is a flowchart of the processing of importing image data.

Referring to the flowchart to FIG. 8, the processing of importing new image data in S302 is described in the following. In this processing, image data and event information accompanying the image data are first imported through an input device such as scanner 8 or from an information storage device such as hard disk drive 6 (S3021). Here, it is assumed that image data contains event information as part of content information, so that the event information is imported together with the image data. However, event information may be separately imported through an input device such as scanner 8. Next, the setting of the location at which the image data is to be stored is input (S3022). Then the image data is input (S3023), and the processing returns from the subroutine. The location and the name of the stored image data are input by the user through an input device such as keyboard 3.

Figure 9:
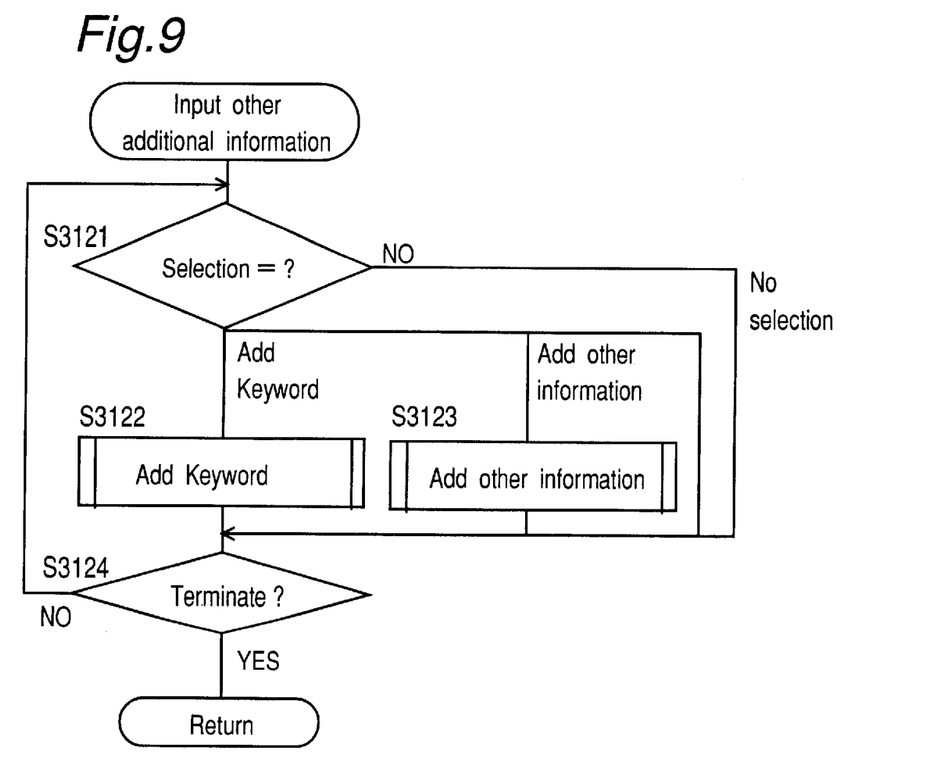
FIG. 9 is a flowchart of the processing of inputting other additional information.

The processing of inputting other additional information in S312 is described in the following, referring to the flowchart of FIG. 9. In this processing, it is first judged whether the processing of adding keywords or adding other information has been chosen (S3121). If nothing has been chosen, then the flow proceeds with S3124. If adding keywords has been chosen, then the processing of adding keywords is executed (S3122). If adding other information has been chosen, then the processing of adding other information is executed (S3123). The processing in S3122 and S3123 is basically the same as in prior processing and not direct concerns of the present invention, so that its detailed description is omitted from here. After the chosen processing is completed, it is judged whether the inputting of additional information should be terminated or not, based on the user's input on the screen (S3124). If the inputting should not be terminated, the flow returns to S3121 to repeat the processing in S3121 through S3124. If the inputting should be terminated, then the subroutine returns.

Figure 10:
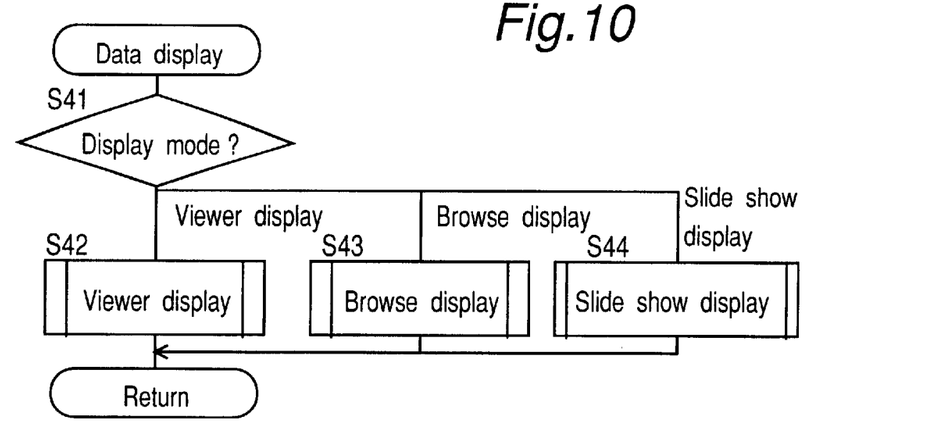
FIG. 10 is a flowchart of the processing of data display.

The processing of data display in S4 is described in the following, referring to the flowchart of FIG. 10. When the processing of data display is chosen, a display mode selection screen 30 is first displayed. In this processing, the display mode chosen by the user on the display mode selection screen is first tested (S41). If viewer display 30a has been chosen, then the processing of viewer display is executed (S42). If browse display 30b has been chosen, then the processing of browse display is executed (S43). If slide show display 30c has been chosen, then the processing of slide show display is executed (S44). The processing in S42, S43, and S44 is detailed below. After the processing in S42, S43, or S44, the subroutine returns.

The viewer display displays an image at its actual size. The browse display displays a group of images at thumb-nail size to tile a plurality of pictures. The slide show display successively displays a group of images at screen size. The processing in these display modes is detailed in the following.

Figure 11:
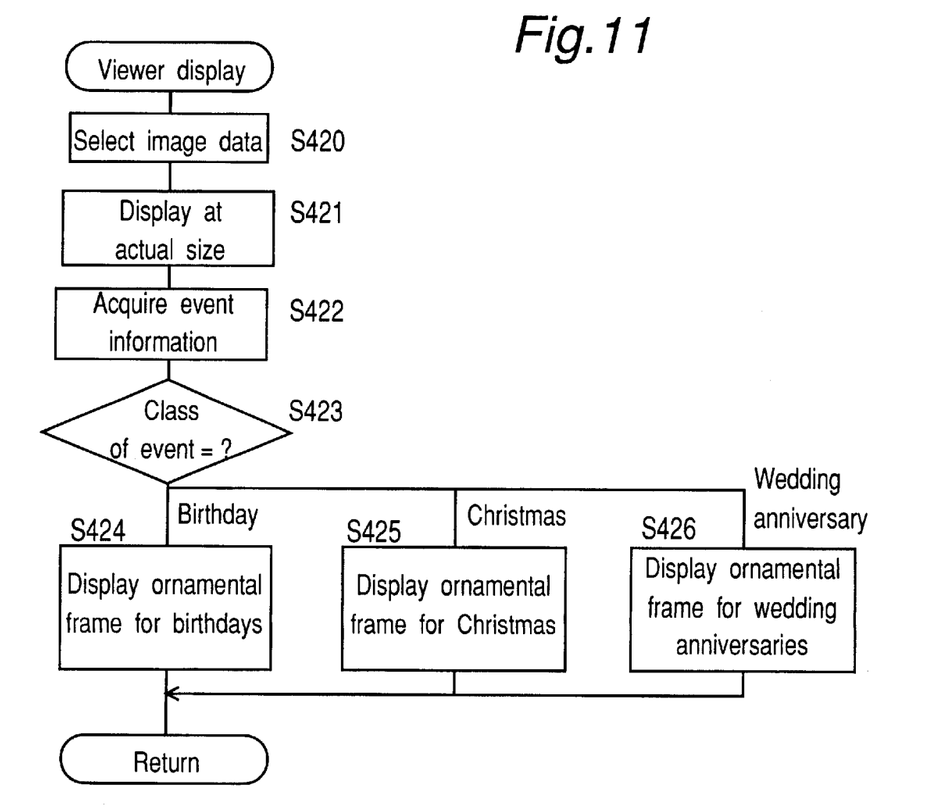
FIG. 11 is a flowchart of the processing of viewer display.
Figure 12:
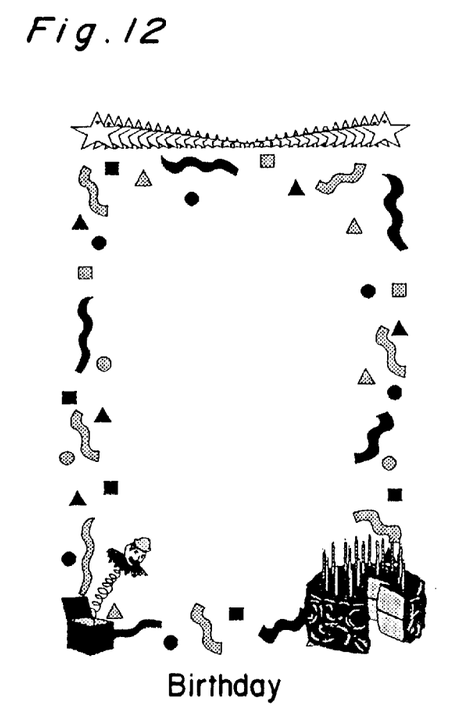
FIG. 12 shows an example of ornamental frames for the event "birthday."
Figure 13:
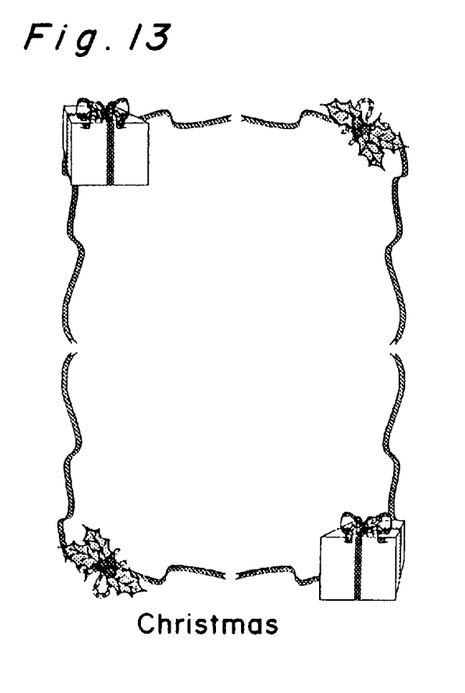
FIG. 13 shows an example of ornamental frames for the event "Christmas."
Figure 14:
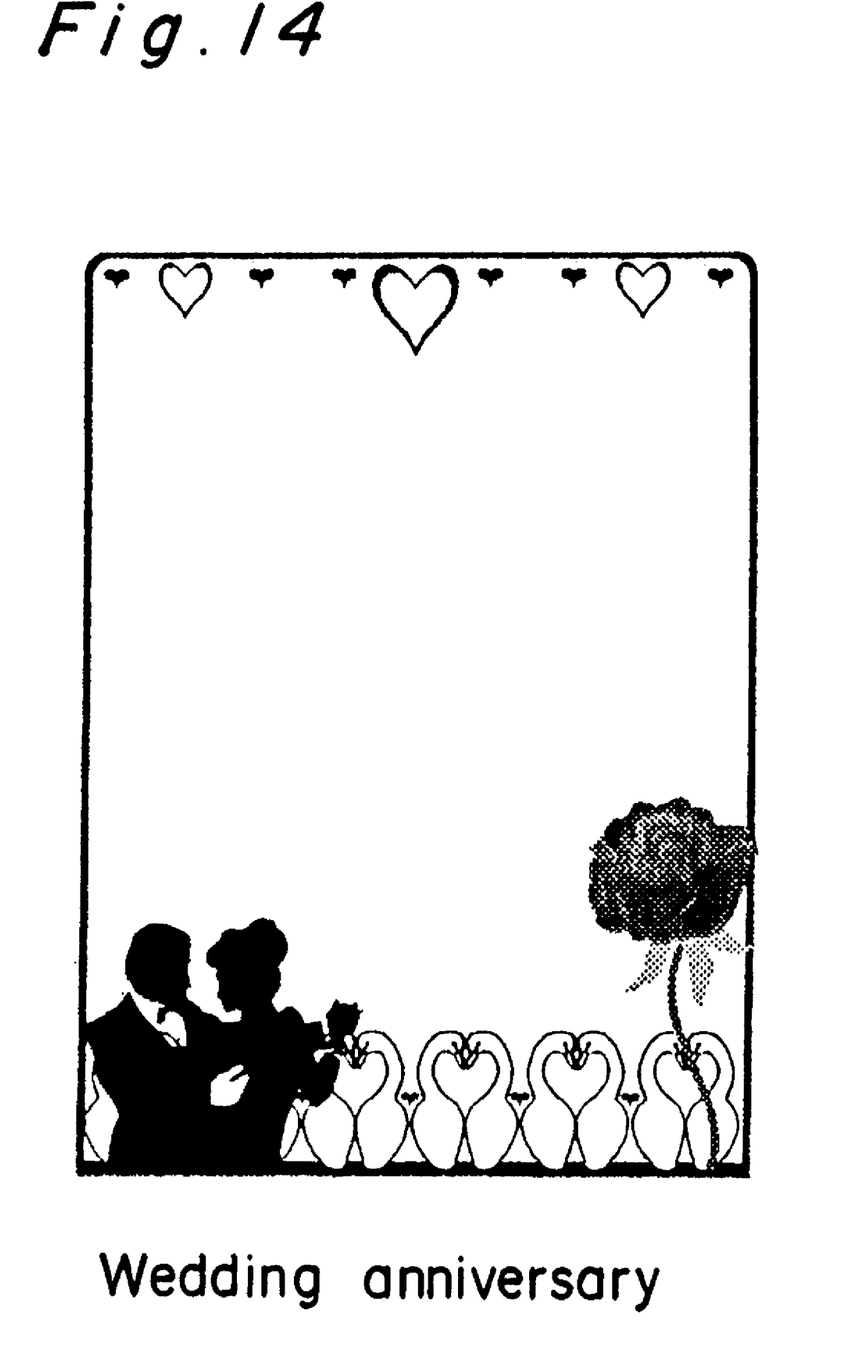
FIG. 14 shows an example of ornamental frames for the event "wedding anniversary."

First, the processing of viewer display in S42 is described, referring to the flowchart of FIG. 11. In this processing, the data of the image to be displayed is first selected based on the user's input (S420). The selected image is displayed at actual size (S421). The event information of the image data is acquired by referring to image database 31 (S422), and the class of the event is determined (S423), based on the event information. If the class of the event is "birthday," then an ornamental frame for birthday images registered in event list 33 is displayed over the image (S424). If the class of the event is "Christmas," then an ornamental frame for Christmas images is displayed (S425). If the class of the event is "wedding anniversary," then an ornamental frame for wedding anniversary images is displayed (S426). After that, the subroutine returns. Examples of ornamental frames corresponding to classes of events are shown in FIGS. 12 to 14. FIG. 12 shows an example of ornamental frames corresponding to "birthday." FIG. 13 shows an example of ornamental frames corresponding to "Christmas." FIG. 14 shows an example of ornamental frames corresponding to "Christmas."

In the above description, the image data of an image and its selected ornamental frame are treated as separate data, and the image and the ornamental frame are displayed on a display device. However, the image data of an image and its selected ornamental frame may be combined into composite image data, and the composite image may be output into a display device. The data of this composite image may be output through a printing device such as a printer, and may be stored in an information storage device.

Figure 15:
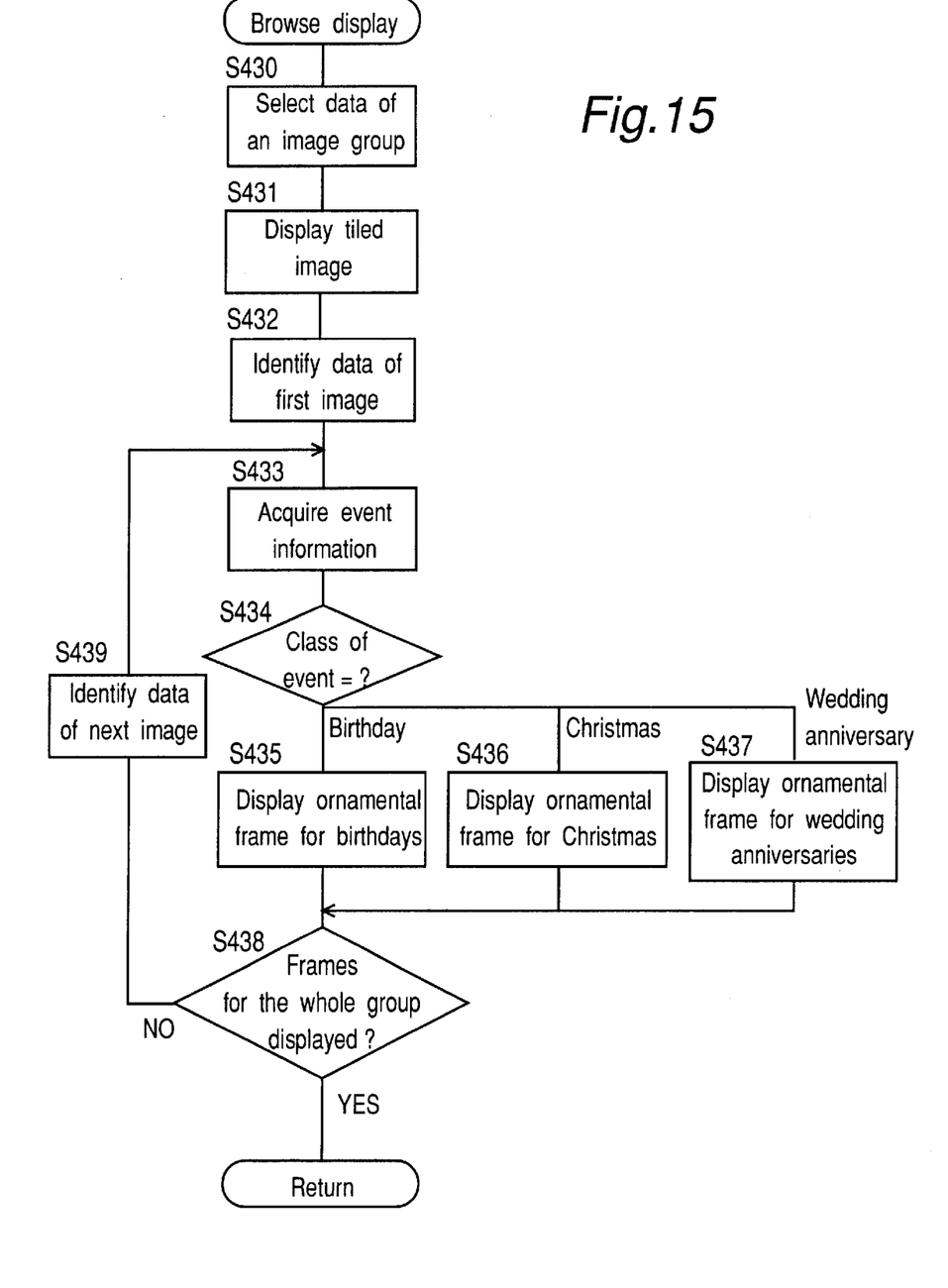
FIG. 15 is a flowchart of the processing of browse display.

Next, the processing of browse display in step S43 is described, referring to the flowchart of FIG. 15. In this processing, the data of an image group to be displayed is first selected based on the user's input (S430). The selected group of images is displayed at thumb-nail size by tiling the group of images (S431). The data of a first image is identified in the data of the selected group of images (S432). The event information associated with the identified image data is acquired by referring to image database 31 (S433), and the class of the event is determined (S434). If the class of the event is "birthday," then an ornamental frame for birthday images is displayed (S435). If the class of the event is "Christmas," then an ornamental frame for Christmas images is displayed (S436). If the class of the event is "wedding anniversary," then an ornamental frame for wedding anniversary images is displayed (S437). After that, it is tested whether ornamental frames have been displayed for all the images of the group selected in S430 (S438). If ornamental frames have been displayed for all the images of the group, then the subroutine returns. If ornamental frames have not been displayed for all the images of the group, then the data of a next image is identified in the data of the selected group of images (S439). Then the flow returns to S433. In this way, the above S433 to S439 are repeated until ornamental frames are displayed for all the images of the group selected in S430. In the present processing, the image data of an image and its ornamental frame may also be combined, and the composite image may be displayed on a display device, as described above.

Figure 16:
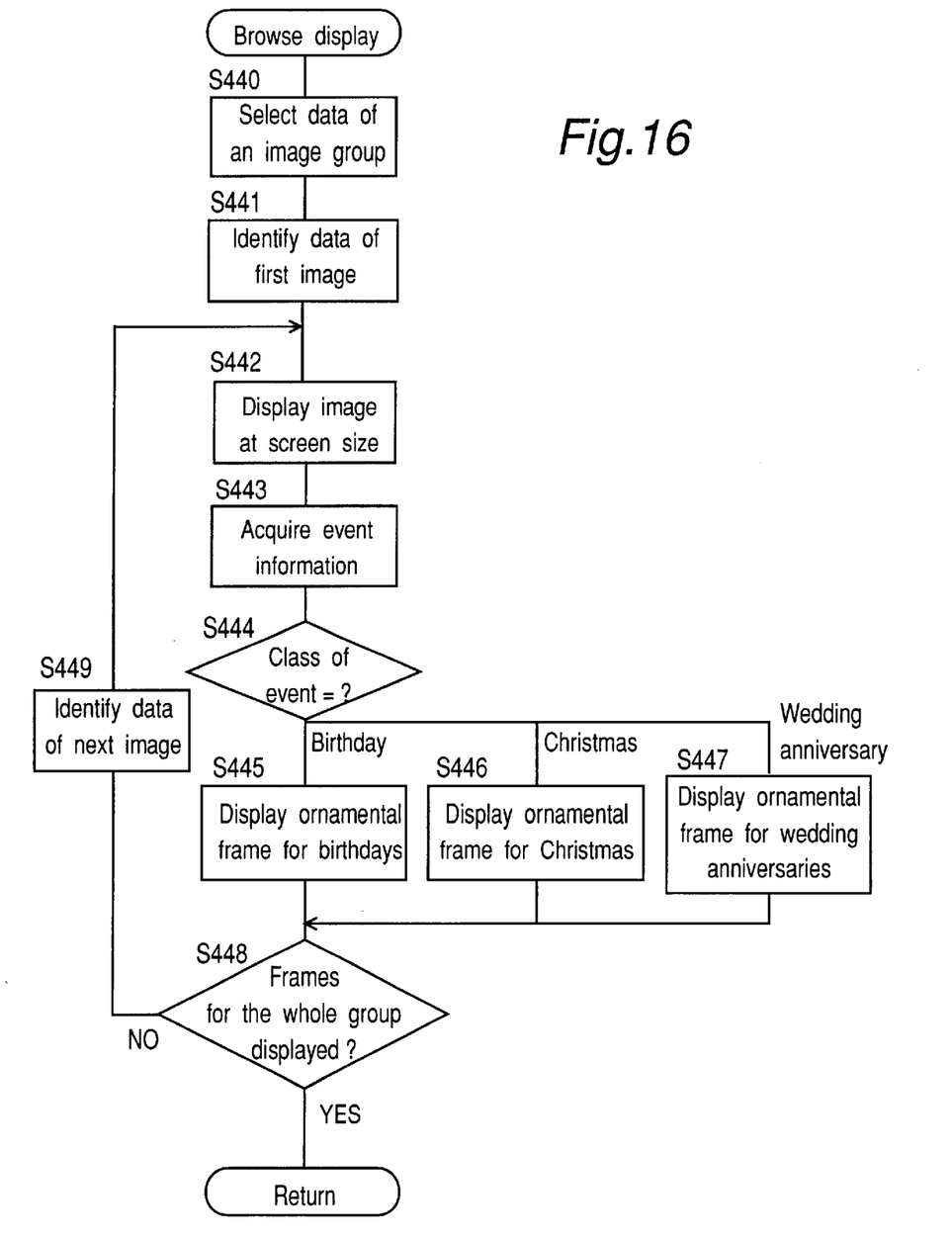
FIG. 16 is a flowchart of the processing of slide show display.

Finally, the processing of slide show display in S44 is described, referring to the flowchart of FIG. 16. In this processing, the data of an image group to be displayed is first selected based on the user's input (S440). The data of a first image is identified in the data of the selected group of images (S441). The image of the identified image data is displayed at screen size (S442). The event information of the identified image data is acquired by referring to image database 31 (S443), and the class of the event is determined (S444). If the class of the event is "birthday," then an ornamental frame for birthday images is displayed (S445). If the class of the event is "Christmas," then an ornamental frame for Christmas images is displayed (S446). If the class of the event is "wedding anniversary," then an ornamental frame for wedding anniversary images is displayed (S447). After that, it is tested whether all the images of the group selected in S440 have been displayed (S448). If all the images of the selected group have been displayed, then the subroutine returns. If all the images of the selected group have not been displayed, then the data of a next image is identified in the data of the selected group of images (S449). Then the flow returns to S442. In this way, the above S442 to S449 are repeated until all the images of the selected group are displayed together with their ornamental frames. In the present processing, the image data of an image and its ornamental frame may also be combined, and the composite image may be displayed on a display device, as described above. Further, in the above descriptions, a decoration image has been selected based on the event information, but other content information, such as keywords, that indicates the contents of the image data may be used for the selection of decoration images. Also, ornamental frames have been used as decoration images, but other images for decoration, such as animals and flowers may be used in place of ornamental frames.

In the above descriptions, event information is registered in image database 31 as additional information, when image data is registered. However, as a variant, event information may not be registered in image database 31, and event information accompanying the image data may be read each time the image is displayed. In this case, S304 to S310 become unnecessary in the flowchart of FIG. 7. Further, in the of acquiring event information (S422, S433, S443) in the processing of viewer display (S42), the processing of browse display (S43), and the processing of slide show display (S44), the content information of image data should be referred to, instead of image database 31.

As described above, when displaying images, the information processing apparatus of the present embodiment automatically selects decoration images, based on content information accompanying the image data to display the decoration images together with the images. By this means, the user only has to assign images to enjoy automatically decorated images without tedious operations.

EFFECTS OF THE INVENTION

According to the information processing apparatus of the present invention, decoration images are selected based on content information accompanying the image data, when images are displayed. The selected decoration images are output together with the images. Therefore, decorations suitable for the images can automatically be created, so that the user's load is alleviated. Further the information apparatus is compatible with FlashPix format, which is supposed to be widely used in the future.

Although the present invention has been fully described in connection with the preferred embodiment thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information processing apparatus comprising:
   an image storage device having images and content information identifying the images in a correlated manner stored therein;
   an ornamental image storage device storing ornamental images for decorating the images;
   an image designation device designating one of the images;
   a selection device automatically selecting one of the ornamental images stored in said ornamental image storage device based on the identification of the content information corresponding to the designated image; and
   an image output device outputting the designated image combined with the selected ornamental image.

2. The information processing apparatus of claim 1 wherein the content information is event information related to each of the images.

3. The information processing apparatus of claim 1 wherein the content information is a title entitled to each of the images.

4. The information processing apparatus of claim 1 wherein the content information is an object intended by each of the images.

5. The information processing apparatus of claim 1 wherein the content information represents a place where the image was formed.

6. The information processing apparatus of claim 1 wherein said image storage device and said ornamental image storage device share a memory.

7. The information processing apparatus of claim 1 wherein said ornamental image storage device is formed separately from said image storage device.

8. The information processing apparatus of claim 1 wherein said ornamental image storage device comprises a removable storage medium.

9. The information processing apparatus of claim 1 further comprising image display device for displaying the stored images wherein said image designation device designates a desired image among images displayed by said image display device.

10. An information processing apparatus comprising:
    an image storage device having images and content information identifying the images in a correlated manner stored therein;
    an ornamental image device storing ornamental images for decorating the images;
    an image designation device designating one of the stored images;
    a selection device automatically selecting one of the ornamental images stored in said ornamental image storage device based on the identification of the content information corresponding to the designated image;
    a composite image forming device forming a composite image from the designated image and the selected ornamental image; and
    an output device outputting the composite image.

11. The information processing apparatus of claim 10 wherein the content information is event information related to each of the images.

12. The information processing apparatus of claim 10 wherein the content information is a title entitled to each of the images.

13. The information processing apparatus of claim 10 wherein the content information is an object intended by each of the images.

14. The information processing apparatus of claim 10 wherein the content information represents a place where the image was formed.

15. An information processing method comprising:
    designating an image;
    reading content information identifying the designated image from an image storage device;
    selecting an ornamental image automatically from among ornamental images stored in a memory based on the identification of the content information corresponding to the designated image; and
    outputting the designated image together with the selected ornamental image.

16. An information processing method comprising:
    designating an image;
    reading content information identifying the designated image from an image storage device;
    selecting an ornamental image automatically from among ornamental images stored in a memory based on the identification of the content information corresponding to the designated image;
    compositing the designated image and the selected image; and
    outputting the composited image.

17. A computer program product stored in a memory, performing the function of:
    designating an image;
    reading content information identifying the designated image from an image storage device;
    selecting an ornamental image automatically from among ornamental images stored in the memory based on the identification-of the content information corresponding to the designated image; and
    outputting the designated image together with the selected ornamental image.

18. A computer program product stored in a memory, performing the function of:
    designating an image;

reading content information identifying the designated image from an image storage device;

selecting an ornamental image automatically from among ornamental images stored in the memory based on the identification of the content information corresponding to the designated image; and compositing the designated image and the selected ornamental image.

19. An information processing apparatus comprising:

an object storage device having object and content information in a correlated manner stored therein;

an ornamental object storage device storing ornamental objects for decoration;

an object designation device designating an object among the stored objects;

a selection device for automatically selecting an ornamental object from among the stored ornamental objects based on the identification of the content information corresponding to the designated image; and an object outputting device outputting the designated object together with the selected ornamental object.

20. An information processing apparatus, comprising:

a memory having images and content information stored therein, the content information identifying each of the images;

a selection device for automatically selecting an ornamental image for at least one of the images based on the content information identifying the at least one image.

* * * * *

UNITED STATES PATENT AND TRADEMARK OFFICE
CERTIFICATE OF CORRECTION

PATENT NO. : 6,421,062 B1
DATED : July 16, 2002
INVENTOR(S) : Kimihiko Higashio

It is certified that error appears in the above-identified patent and that said Letters Patent is hereby corrected as shown below:

<u>Title page,</u>
Item [56], References Cited, U.S. PATENT DOCUMENTS, please add
-- 5,343,386 A 8/1994 Barber ..... 364/400 --.

Signed and Sealed this

Seventh Day of January, 2003

JAMES E. ROGAN
*Director of the United States Patent and Trademark Office*